US008477749B2

(12) United States Patent
Zhu et al.

(10) Patent No.: US 8,477,749 B2
(45) Date of Patent: Jul. 2, 2013

(54) WIRELESS COMMUNICATION SYSTEM, MANAGEMENT SERVER, WIRELESS TERMINAL, AND NETWORK SELECTION METHOD IN WHICH NETWORKS THAT SATISFY CONDITION REQUESTED BY WIRELESS TERMINAL THAT HAS REQUESTED A CONNECTION BASED ON NETWORK INFORMATION INCLUDING A LATEST TRANSMISSION SPEED IS SELECTED (75) Inventors: Mingzhao Zhu, Tokyo (JP); Takao Miyabe, Tokyo (JP)

(73) Assignee: NEC Corporation, Tokyo (JP)

( * ) Notice: Subject to any disclaimer, the term of this patent is extended or adjusted under 35 U.S.C. 154(b) by 871 days.

(21) Appl. No.: 12/567,897

(22) Filed: Sep. 28, 2009

(65) Prior Publication Data

US 2010/0080174 A1    Apr. 1, 2010

(30) Foreign Application Priority Data

Sep. 30, 2008 (JP) ................................. 2008-254756
Jul. 27, 2009 (JP) ................................. 2009-174172

(51) Int. Cl.
  *H04W 4/00*    (2009.01)
(52) U.S. Cl.
  USPC ............ 370/338; 455/437; 455/436; 455/438
(58) Field of Classification Search
  None
  See application file for complete search history.

(56) References Cited

U.S. PATENT DOCUMENTS

| 5,353,332 | A | * | 10/1994 | Raith et al. ..................... 455/455 |
| 5,422,933 | A | * | 6/1995 | Barnett et al. ................. 455/439 |
| 5,509,051 | A | * | 4/1996 | Barnett et al. ................. 455/443 |
| 5,561,841 | A | * | 10/1996 | Markus .......................... 455/446 |
| 5,794,149 | A | * | 8/1998 | Hoo .............................. 455/438 |
| 5,799,243 | A | * | 8/1998 | Ojaniemi ...................... 455/63.1 |
| 5,924,042 | A | * | 7/1999 | Sakamoto et al. ............. 455/458 |
| 6,026,303 | A | * | 2/2000 | Minamisawa ................. 455/446 |
| 6,249,511 | B1 | * | 6/2001 | Kado ............................. 370/232 |
| 6,397,277 | B1 | * | 5/2002 | Kato et al. ..................... 710/104 |
| 6,526,039 | B1 | * | 2/2003 | Dahlman et al. .............. 370/350 |

(Continued)

FOREIGN PATENT DOCUMENTS

| CN | 1535045 A | 10/2004 |
| JP | 2000-13823 A | 1/2000 |

(Continued)

OTHER PUBLICATIONS

Japanese Office Action for JP2009-174172 mailed on Feb. 12, 2013.

(Continued)

*Primary Examiner* — Warner Wong
*Assistant Examiner* — Dung B Huynh (57) ABSTRACT

A wireless terminal that can connect to a plurality of networks makes a request for a connection to a management server. The management server holds network information about unchanging service characteristics of a plurality of networks constituting a wireless communication area. The management server selects networks satisfying a request condition of a wireless terminal that has requested a connection based on the network information and notifies the selected networks, as candidates for connection, to the wireless terminal. The wireless terminal measures changing service characteristics of the candidates for connection notified from the management server, selects a network from the candidates for connection based on a measurement result, and connects to the selected network.

12 Claims, 7 Drawing Sheets

U.S. PATENT DOCUMENTS

| | | | |
|---|---|---|---|
| 6,834,193 B1* | 12/2004 | Linderborg et al. | 455/450 |
| 7,006,798 B2* | 2/2006 | Miyoshi et al. | 455/67.11 |
| 7,327,987 B2* | 2/2008 | Miyamoto et al. | 455/69 |
| 7,415,273 B2* | 8/2008 | Khawand | 455/434 |
| 7,801,074 B2* | 9/2010 | Kim et al. | 370/329 |
| 7,889,698 B2* | 2/2011 | Usuda et al. | 370/331 |
| 7,984,179 B1* | 7/2011 | Huang | 709/233 |
| 8,060,091 B2* | 11/2011 | Goransson | 455/436 |
| 8,081,978 B2* | 12/2011 | Pecen et al. | 455/435.2 |
| 2003/0216140 A1* | 11/2003 | Chambert | 455/426.1 |
| 2003/0224790 A1* | 12/2003 | Choi | 455/435.3 |
| 2004/0008646 A1* | 1/2004 | Park et al. | 370/331 |
| 2004/0072567 A1* | 4/2004 | Cao et al. | 455/442 |
| 2004/0142693 A1* | 7/2004 | Feder et al. | 455/443 |
| 2005/0041615 A1* | 2/2005 | Hayashi et al. | 370/328 |
| 2005/0070285 A1* | 3/2005 | Goransson | 455/436 |
| 2005/0091395 A1* | 4/2005 | Harris et al. | 709/232 |
| 2005/0100030 A1* | 5/2005 | Chaskar et al. | 370/401 |
| 2005/0117516 A1* | 6/2005 | Yang | 370/232 |
| 2005/0208942 A1* | 9/2005 | Pekonen et al. | 455/436 |
| 2005/0245298 A1* | 11/2005 | Mori | 455/575.7 |
| 2006/0262793 A1* | 11/2006 | Vare et al. | 370/390 |
| 2007/0097924 A1* | 5/2007 | Martinovich et al. | 370/332 |
| 2007/0115892 A1* | 5/2007 | Lee et al. | 370/333 |
| 2007/0201394 A1 | 8/2007 | Jeon et al. | |
| 2008/0026761 A1* | 1/2008 | Usuda et al. | 455/442 |
| 2009/0047963 A1* | 2/2009 | Kim | 455/438 |
| 2009/0197603 A1* | 8/2009 | Ji et al. | 455/436 |
| 2009/0252113 A1* | 10/2009 | Take | 370/331 |

FOREIGN PATENT DOCUMENTS

| | | |
|---|---|---|
| JP | 2003-259457 A | 9/2003 |
| JP | 2005-168041 A | 6/2005 |
| JP | 2005-318235 A | 11/2005 |
| JP | 2007-515123 A | 6/2007 |
| JP | 2008-131346 A | 6/2008 |
| WO | 2004/047476 A1 | 6/2004 |

OTHER PUBLICATIONS

Chinese Office Action for CN200910176667.6 dated on Feb. 28, 2013.

Huawei: "Access Network Discovery and Selection Procedure", 3GPP TSG-SA2 Meeting #65, S2-083357, Prague, Czech Republic, May 12-16, 2008, Cited in the Extended European Search Report.

Nextwave: "Frequency and conditions for access network discovery and selection procedure", 3GPP TSG-SA2 Meeting #65, S2-083672, Prague, Czech Republic, May 12-16, 2008, Cited in the Extended European Search Report.

Panasonic: "Access Network Discovery and Selection", 3GPP TSG CT WG1 Meeting #49, C1-072285, Kobe, Japan, Oct. 8-12, 2007, Cited in the Extended European Search Report.

The Extended European Search Report for EP 09075442.5, dated on Mar. 7, 2013.

* cited by examiner

WIRELESS COMMUNICATION SYSTEM, MANAGEMENT SERVER, WIRELESS TERMINAL, AND NETWORK SELECTION METHOD IN WHICH NETWORKS THAT SATISFY CONDITION REQUESTED BY WIRELESS TERMINAL THAT HAS REQUESTED A CONNECTION BASED ON NETWORK INFORMATION INCLUDING A LATEST TRANSMISSION SPEED IS SELECTED

This application is based upon and claims the benefit of priorities from Japanese Patent Applications No. 2008-254756 filed on Sep. 30, 2008, and No. 2009-174172 filed on Jul. 27, 2009, the contents of which are incorporated by reference.

BACKGROUND OF THE INVENTION

1. Field of the Invention

The present invention relates to a wireless communication system that can select a network for connecting a wireless terminal.

2. Description of the Related Art

There is a wireless communication system that covers communication areas by cells formed by wireless base stations to allow a wireless terminal to communicate in the communication areas. For example, in WiMAX (Worldwide Interoperability for Microwave Access), cells cover communication areas to allow communications in various places.

Providers construct networks, such as a WiMAX network, respectively. Therefore, communication areas of networks may overlap in the same area. The provider of each network independently sets the service area, provided services, fee, etc. Therefore, the service area, provided services, fee, etc., may differ in each network. The communication quality of the wireless line may also be different from one network to another network even in the same location since the arrangements of the wireless base stations are different from one network to another network.

However, the user usually subscribes to the network of a provider. Therefore, the wireless terminal connects to the subscribed network when the user is at a location where the communication areas of networks overlap. Therefore, the wireless terminal does not always connect to the network most suitable for the requested conditions. For example, the wireless terminal may not be able to connect to a network having a lower fee, a network that provides a user's desired service, or a network in which the communication quality of the wireless line is excellent.

Consequently, Japanese Patent Laid-Open Nos. 2005-318235 and 2008-131346 disclose techniques of a communication terminal that selects and connects to an optimal network among networks.

Japanese Patent Laid-Open No. 2005-318235 describes that a communication terminal stores the contents of communication services of IP (Internet Protocol) phones and selects a communication service having the lowest price based on the fee per packet, etc.

Japanese Patent Laid-Open No. 2008-131346 describes that a monitoring control server arranged separately from the communication terminal always changes the communication path. According to the technique, the monitoring control server includes: test packet transmission instructing means for transmitting a test packet transmission instruction; transmission quality measuring means for receiving the reception result of a test packet to obtain transmission qualities of communication paths; communication path selecting means for selecting a communication path based on the transmission qualities of the communication paths; and communication path instructing means for transmitting a communication path setting instruction. The communication terminal includes: test packet transmitting means for transmitting a test packet; test packet reception result transmitting means for transmitting a reception result of the test packet; and communication path setting means for setting a communication path.

However, the techniques described in Japanese Patent Laid-Open Nos. 2005-318235 and 2008-131346 do not take into consideration the fact that the indexes for selecting a network include indexes that always change, such as the transmission quality of the communication line, and indexes that rarely change, such as service areas and the fee per packet. Therefore, a network may not be appropriately selected in a method corresponding to the properties of the indexes.

In Japanese Patent Laid-Open No. 2005-318235, the communication terminal stores the contents of communication services and selects a communication service based on the fee per packet, etc. However, a change in the setting of network services, such as service area and fee per packet, cannot be easily notified to all communication terminals in real time. Therefore, the technique of Japanese Patent Laid-Open No. 2005-318235 does not select a network based on an appropriate method according to the indexes, and the communication terminal cannot appropriately select a network after the setting of the network services changes.

SUMMARY OF THE INVENTION

An object of the present invention is to provide a technique that can determine a network selection based on an appropriate method according to indexes.

To attain the object, an exemplary aspect of the invention provides a wireless communication system comprising:

a management server that holds network information about unchanging service characteristics of each of a plurality of networks constituting a communication area by wireless; and a wireless terminal that can connect to the plurality of networks, wherein the management server that selects networks satisfying a condition that is requested by a wireless terminal that has requested a connection based on the network information and that notifies the selected networks as candidates for connection to the wireless terminal, and the wireless terminal requests a connection to the management server, measures changing service characteristics of the candidates for connection notified from the management server, selects a network from the candidates for connection based on a measurement result, and connects to the selected network.

An exemplary aspect of the invention provides a management server comprising:

storage means for holding network information about unchanging service characteristics of each of a plurality of networks constituting a communication area by wireless;

selecting means for selecting networks satisfying a condition that is requested by a wireless terminal that has requested a connection based on the network information held by the storage means; and notification means for notifying the networks selected by the selecting means as candidates for connection to the wireless terminal.

An exemplary aspect of the invention provides a wireless terminal that can connect to a plurality of networks constituting a communication area by wireless, the wireless terminal comprising:

requesting means for transmitting a connection request to a management server that holds network information about the unchanging service characteristics of the plurality of networks;

measuring means for measuring changing service characteristics of candidates for connection selected by the management server based on the unchanging service characteristics of the network information in response to the connection request; and connecting means for selecting a network from the candidates for connection based on a measurement result by the measuring means and for connecting to the selected network.

An exemplary aspect of the invention provides a network selection method of selecting a connection of a wireless terminal from a plurality of networks constituting a communication area by wireless, the network selection method comprising:

a management server holding, in advance, network information about unchanging service characteristics of the plurality of networks;

the wireless terminal requesting a connection to the management server;

the management server selecting networks satisfying a condition that is requested by the wireless terminal based on the network information and notifying the selected networks, as candidates for connection, to the wireless terminal; and the wireless terminal measuring changing service characteristics of the notified candidates for connection and selecting a connection from the candidates for connection based on a measurement result.

An exemplary aspect of the invention provides a management server program causing a computer to execute procedures of:

holding network information about unchanging service characteristics of each of a plurality of networks constituting a communication area by wireless;

selecting networks satisfying a condition requested by a wireless terminal that has requested a connection based on the held network information; and notifying the selected networks, as candidates for connection, to the wireless terminal.

The above and other objects, features, and advantages of the present invention will become apparent from the following description with references to the accompanying drawings which illustrate examples of the present invention.

DETAILED DESCRIPTION OF THE PREFERRED EMBODIMENTS

An exemplary embodiment will be described in detail with reference to the drawings.
(First Exemplary Embodiment)

A wireless communication system of the exemplary embodiment is a communication system that selects a network for connecting a wireless terminal among networks. An example of the networks includes a WiMAX network. In the exemplary embodiment, a wireless terminal and a management server share the operation of selecting a network. The management server makes a selection based on unchanging service characteristics of networks, and the wireless terminal further makes a selection based on changing service characteristics.

The service characteristics including unchanging and changing service characteristics are characteristics of network services serving as indexes for selecting a network for connecting a wireless terminal. To which network the connection will be made is determined based on the service characteristics and conditions that are requested by the wireless terminal.

The unchanging service characteristics are determined by network configuration, setting, contract, etc., and are service characteristics that do not change during communication. Examples of the unchanging service characteristics include service area, provided services, data capacity, delay level, fluctuation level, fee setting, and contract coverage.

The service area is information of an area where the services of a WiMAX network can be used. For example, the information indicates whether the service can be used nationwide, or whether the service can be used only in a specific area. The data capacity indicates the data capacity of communication line or the transmission speed. The delay level is an index indicating how much delay is expected in the communication line. The fluctuation level is an index indicating how much change is expected in the effective transmission speed, or how stable the transmission speed is.

The fee setting is an index of fees, such as the fee per packet. The management server may determine that the requested conditions are satisfied if the index value of fee is below a threshold.

If the wireless terminal or the contract by the user limits the networks that can be connected, the connection needs to be selected from the limited networks.

The changing service characteristics are service characteristics that may change during communication. Examples of the changing service characteristics include effective transmission speed, error rate, throughput, transmission delay, and other qualities of communication.

According to the exemplary embodiment, management server 11 makes a selection based on the unchanging service characteristics with relatively fixed properties determined by the network configuration, setting, etc, and wireless terminal 12 makes a selection based on the changing service characteristics requested following a change. Therefore, a determination of the network selection can be made based on an appropriate method according to the indexes.

Figure 1:
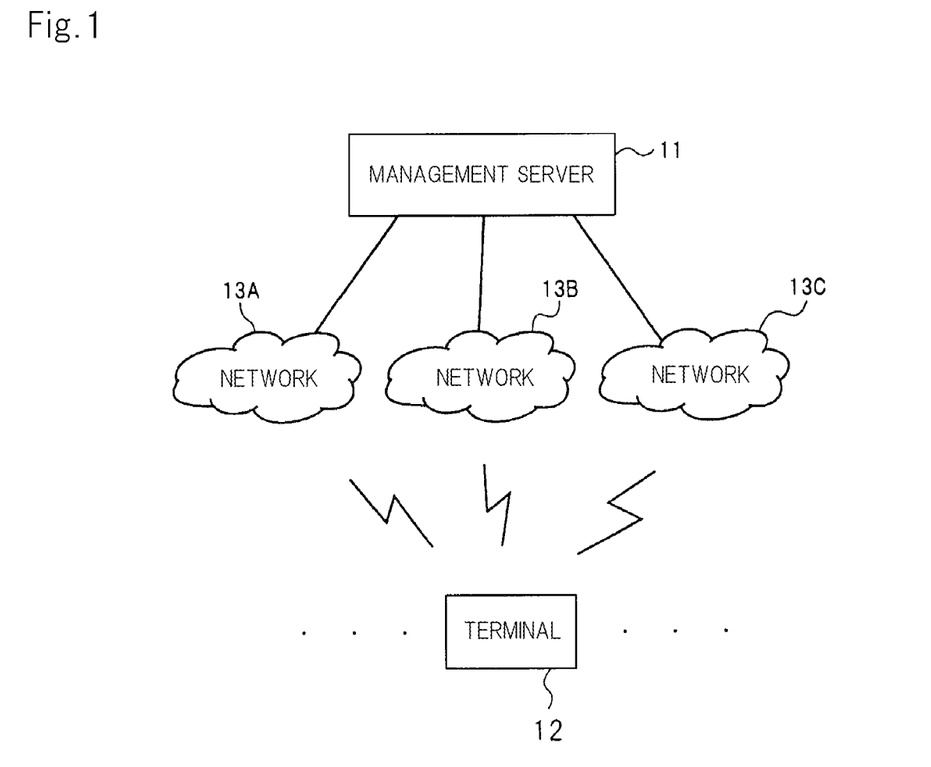
FIG. 1 is a block diagram of a configuration of a wireless communication system of first exemplary embodiment.

FIG. 1 is a block diagram of a configuration of a wireless communication system of the exemplary embodiment. According to FIG. 1, the wireless communication system of the exemplary embodiment includes management server 11 and wireless terminal 12. A plurality of wireless terminals 12 actually exist.

Management server 11 is connected to networks 13A to 13C constituting a wireless communication area and holds network information that is information of the unchanging service characteristics of networks 13A to 13C. An example of networks 13A to 13C of the exemplary embodiment includes WiMAX networks managed by different providers.

Management server 11 selects networks 13 satisfying the conditions requested by wireless terminal 12 that has requested a connection from networks 13A to 13C based on the network information and notifies selected networks 13 as candidates for connection to wireless terminal 12. In that case, management server 11 may use location information of wireless terminal 12 to select candidates for connection from networks 13 with service area including the location of wireless terminal 12. Management server 11 may also set priorities to the candidates for connection. For example, higher priorities may be set to networks 13 that have a lower fee among networks 13 satisfying other requested conditions. In that case, management server 11 may notify the information of the candidates for connection to wireless terminal 12 in packets. Management server 11 may not manage information for allocating resources of networks 13 to wireless terminal 12.

Management server 11 usually selects a plurality of networks as candidates for connection. However, if only one network 13 satisfies the requested conditions, only one network may serve as the candidate for connection.

Wireless terminal 12 or the contract by the user may limit the networks that can be connected. In that case, management server 11 selects candidates for connection from limited networks 13.

The requested conditions are conditions required for the services used by the user of wireless terminal 12. Examples of the requested conditions include service area, services for use, data capacity, delay level, fluctuation level, fee, and other requests by the user related to the service characteristics.

Management server 11 may determine the service area based simply on whether the service area includes the location of wireless terminal 12. Alternatively, the user of wireless terminal 12 may specify whether to use network 13 that has a nationwide service area or to use network 13 that has a specific service area including the location of wireless terminal 12. In that case, management server 11 can make the determination based on whether the specified conditions are satisfied. For example, if the user moves a long distance while using wireless terminal 12, the user would desire network 13 that has a nationwide service area. If the user intends to acquire detailed local information of the current location, the user may desire network 13 that has a specific service area.

Wireless terminal 12 is a wireless terminal that can be connected to networks 13A to 13C. An example of wireless terminal 12 of the exemplary embodiment includes a communication apparatus that connects to a WiMAX network, and a communication card is used by inserting it into a personal computer. The communication card includes the main functions of wireless terminal 12 of the exemplary embodiment, and the personal computer operates using the functions. An input apparatus and an output apparatus may also be provided.

Wireless terminal 12 requests a network connection, notifies requested conditions to management server 11, and receives a notification of candidates for connection from management server 11. At this time, wireless terminal 12 may notify, to management server 11, the location information indicating the location of wireless terminal 12 measured by a GPS as part of the requested conditions. Wireless terminal 12 measures the changing service characteristics of the notified candidates for connection, selects one of networks 13 from the candidates for connection based on the measurement result, and connects to selected network 13.

The changing service characteristics can be measured by transmitting a test packet. For example, wireless terminal 12 may transmit the test packet to a predetermined server (not shown) in network 13, and the server may measure the changing service characteristics, such as effective transmission speed, delay time, and error rate, based on the reception status of the test packet and notify the measurement result to wireless terminal 12.

Wireless terminal 12 may set allowable levels of the changing service characteristics in advance and select network 13, in which the changing service characteristics are within the allowable levels, from the candidates for connection. If priorities are set to the candidates for connection, wireless terminal 12 may select network 13 having the highest priority among networks 13 that satisfy the allowable levels.

While connected to and communicating with selected network 13, wireless terminal 12 measures the changing service characteristics of the candidates for connection including network 13 and switches the network to be connected among the candidates for connection according to the measurement result.

Figure 2:
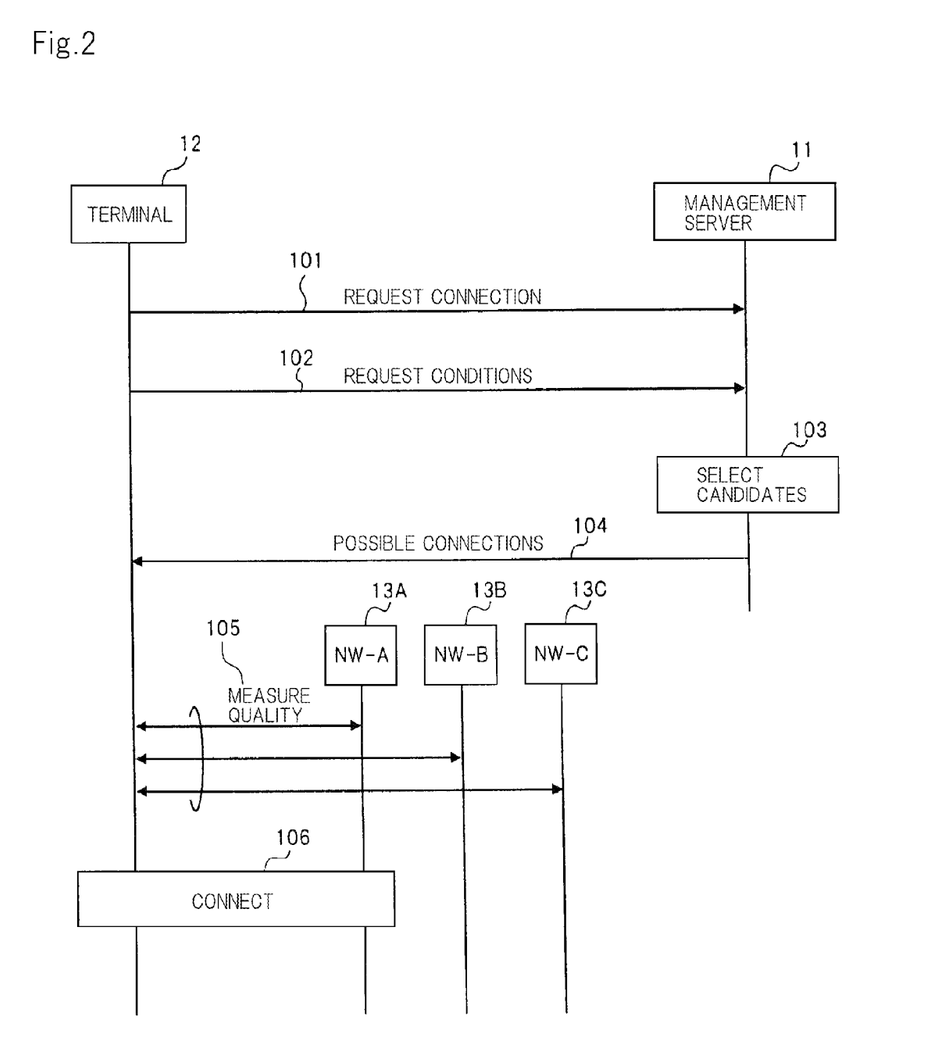
FIG. 2 is a sequence diagram of an operation by the wireless communication system of the first exemplary embodiment to determine a connection of a wireless terminal.

FIG. 2 is a sequence diagram indicating an operation by the wireless communication system of the exemplary embodiment determining the connection of the wireless terminal. As shown in FIG. 2, wireless terminal 12 connects to management server 11 through one of networks 13A to 13C and requests a network connection (step 101). At the same time or subsequently, wireless terminal 12 notifies management server 11 of requested conditions related to the network connection (step 102).

Management server 11 selects networks 13 as candidates for connection based on network information included in management server 11 and the requested conditions notified from wireless terminal 12 (step 103) and notifies the selected candidates for connection to wireless terminal 12 (step 104). It is assumed herein that networks 13A to 13C are the candidates for connection.

Wireless terminal 12 measures the line qualities of networks 13A to 13C that are the notified candidates for connection (step 105). Wireless terminal 12 then selects network 13 that is optimal as a connection based on the measurement result and connects to selected network 13 (step 106). FIG. 2 illustrates an example in which network 13A is selected.

Figure 3:
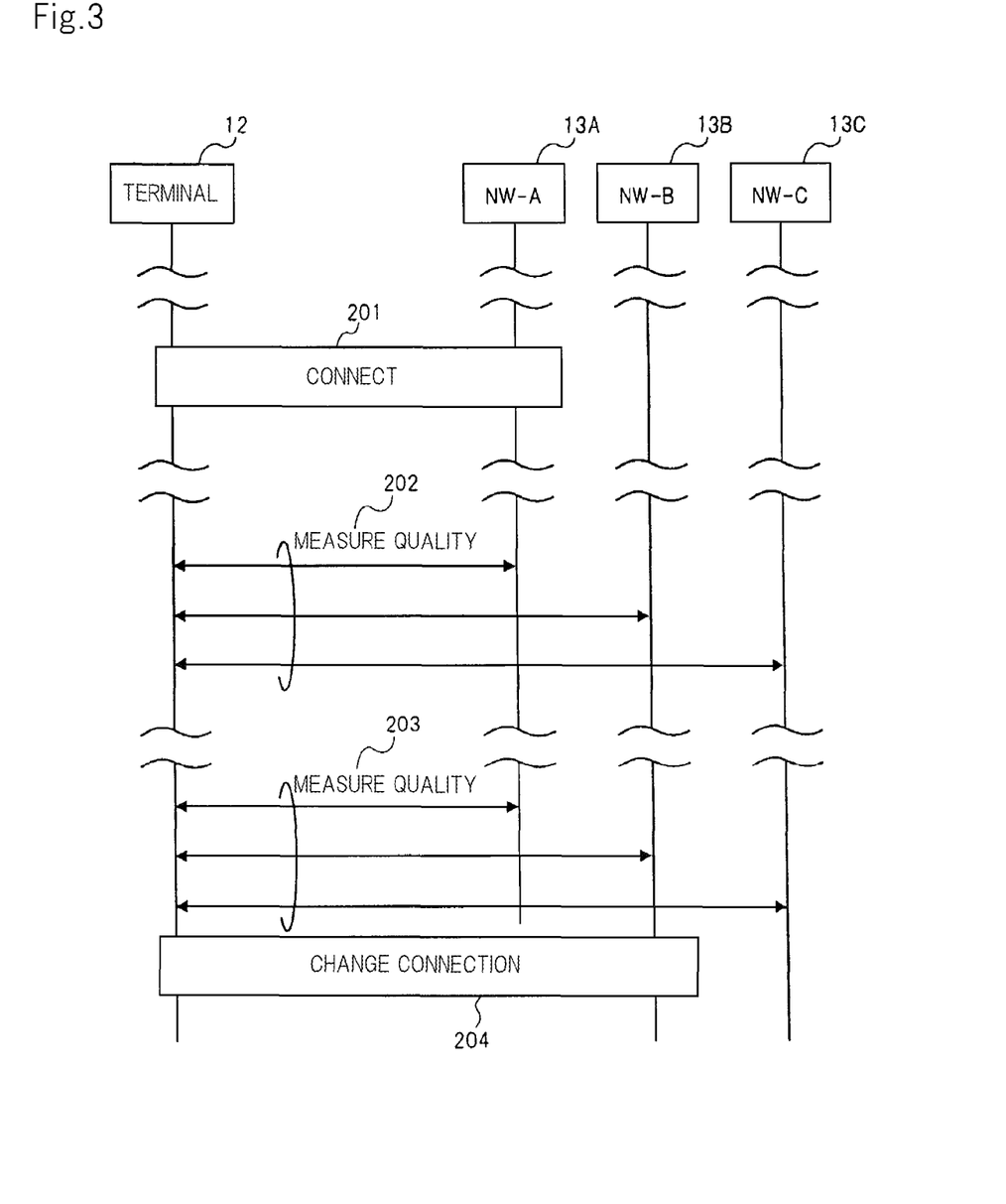
FIG. 3 is a sequence diagram of an operation of changing the connection of the wireless terminal of the first exemplary embodiment.

FIG. 3 is a sequence diagram of an operation of changing the connection of the wireless terminal of the exemplary embodiment. As shown in FIG. 3, after wireless terminal 12 connects to network 13A (step 201), the changing service characteristics of networks 13A to 13C as candidates for connection are periodically measured to determine whether to change the connection (step 202).

In the measurement of the changing service characteristics (step 203), if the changing service characteristics of network 13A, as the current connection, are reduced and do not satisfy the requested conditions, wireless terminal 12 switches the connection from network 13A to another network 13 that satisfies the requested conditions (step 204). FIG. 3 illustrates an example in which the connection is changed from network 13A to network 13B.

Figure 4:
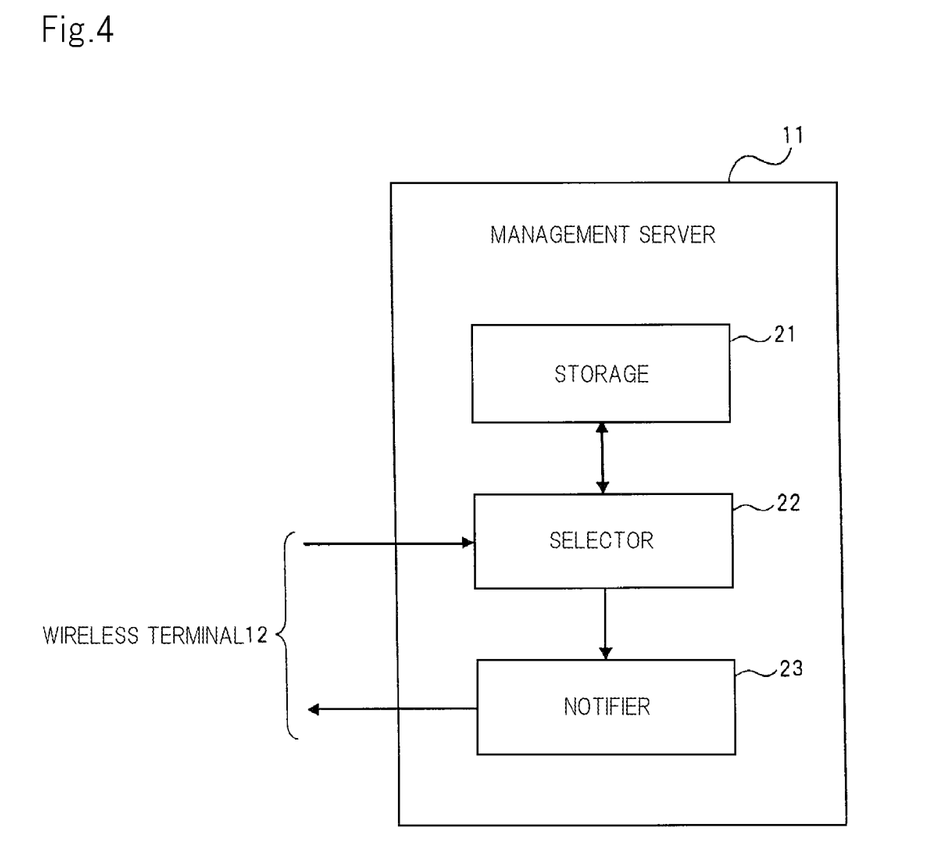
FIG. 4 is a block diagram of a configuration of management server 11 of the first exemplary embodiment.

FIG. 4 is a block diagram of a configuration of management server 11 of the exemplary embodiment. As shown in FIG. 4, management server 11 includes storage 21, selector 22, and notifier 23.

Storage 21 holds network information about the unchanging service characteristics of networks 13A to 13C.

Based on the network information held in storage 21, selector 22 selects network 13 satisfying the requested conditions of wireless terminal 12 that has requested a connection.

Notifier 23 notifies network 13, as a candidate for connection, selected by selector 22 to wireless terminal 12.

Figure 5:
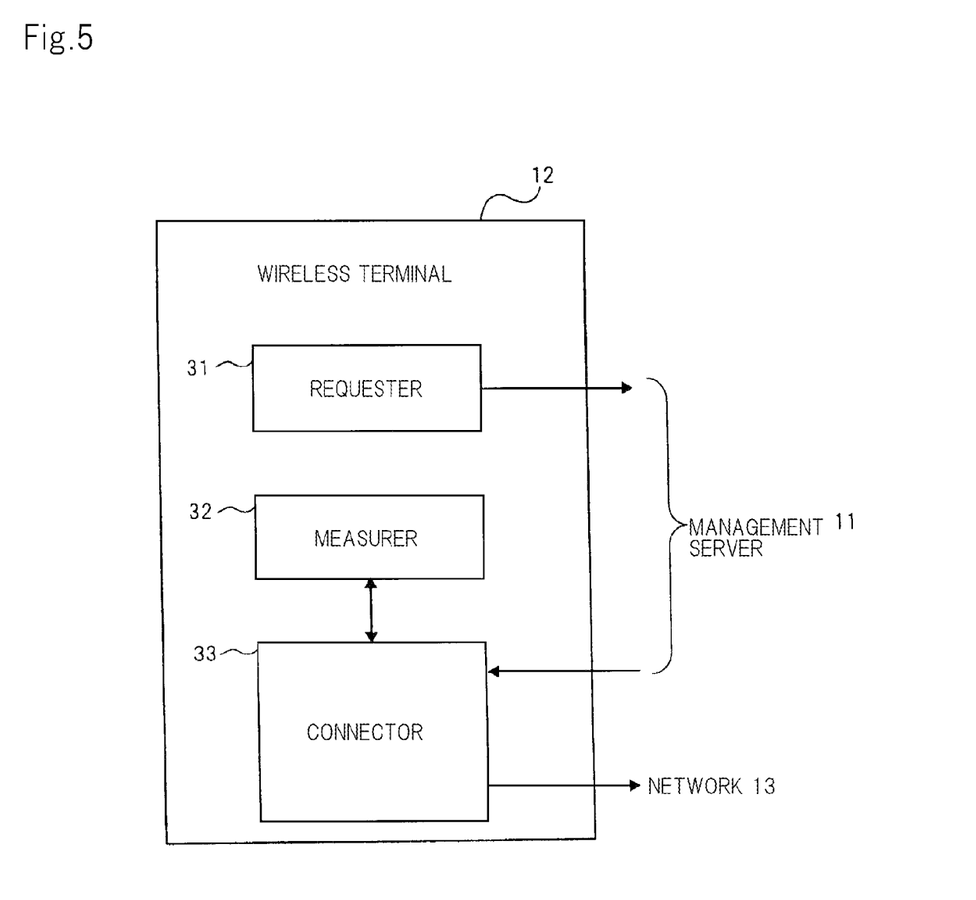
FIG. 5 is a block diagram of a configuration of wireless terminal 12 of the first exemplary embodiment.

FIG. 5 is a block diagram of a configuration of wireless terminal 12 of the exemplary embodiment. As shown in FIG. 5, wireless terminal 12 includes requester 31, measurer 32, and connector 33.

According to an operation by the user, etc., requester 31 transmits a connection request for requesting connection to network 13 to management server 11.

Measurer 32 measures the changing service characteristics of the networks as candidates for connection selected by management server 11 based on the unchanging service characteristics of the network information. During communication after the connection to selected network 13, measurer 32 periodically measures the changing service characteristics of the candidates for connection including network 13.

In an example of measuring the changing service characteristics by using a test packet, measurer 32 may transmit the test packet to a server in network 13 through connector 33 and receive the measurement result from the server.

Connector 33 selects one of networks 13 from among the candidates for connection as a connection based on the measurement result of measurer 32, connects to selected network 13, and receives services from network 13. Connector 33 also switches network 13 to be connected from among the candidates for connection in accordance with the measurement result by measurer 32, during communication.

In requesting the network connection to management server 11, the way wireless terminal 12 connects to management server 11 is not particularly limited in the exemplary embodiment. For example, wireless terminal 12 may connect to management server 11 through one of connectable networks 13. In that case, the use of network 13 for connecting to management server 11 may be free of charge. Wireless terminal 12 may be connected to management server 11 through network 13 that the user of wireless terminal 12 is subscribing to.

Specific processes of apparatuses when wireless terminal 12 requests the network connection to management server 11 are not particularly limited in the exemplary embodiment. For example, the user may connect to management server 11 through a personal computer (wireless terminal 12) connected with a communication card to activate an application on management server 11. The user then inputs a user ID or a password to log in to the application and uses the application to transmit a connection request and requested conditions to management server 11.

The level of user contract may also be set to the user of wireless terminal 12 in the exemplary embodiment. Networks 13 connectable by wireless terminal 12 may be limited by the user level. In that case, the user level belongs to the unchanging service characteristics, and management server 11 may determine the user level.

(Second Exemplary Embodiment)

As in the first exemplary embodiment, a wireless communication system of a second exemplary embodiment is a communication system that selects a network for connecting a wireless terminal from among networks. An example of the networks includes a WiMAX network. In the present exemplary embodiment too, a wireless terminal and a management server share the operation of selecting a network. The management server makes a selection based on unchanging service characteristics of networks, and the wireless terminal further makes a selection based on changing service characteristics.

In the second exemplary embodiment, the changing service characteristics include the transmission speed when the wireless terminal performs data communication. The required transmission speed is predetermined for each type of data communication performed by the wireless terminal. The wireless terminal measures transmission speeds of candidates for selection and selects a network to be connected for each type of data communication from among the candidates for connection based on the transmission speed required for each type of data communication and the measured transmission speed. Examples of the types of data communications include access to data stored in a server, etc., a VoIP (Voice over Internet Protocol), and downloading and streaming of video content.

To select a network, the wireless terminal selects a network, in which the measured transmission speed is closest to the required transmission speed, in the example of the present exemplary embodiment.

In the example of the present exemplary embodiment, to concurrently perform a plurality of types of data communications, the wireless terminal selects and connects networks according to the types of data communications and disperses the plurality of types of data communications to corresponding networks.

As in the first exemplary embodiment shown in FIG. 1, the wireless communication system according to the second exemplary embodiment includes management server 11 and wireless terminal 12.

Management server 11 selects networks 13 satisfying a condition that is requested by wireless terminal 12 that has requested a connection from networks 13A to 13C based on the network information and notifies selected networks 13 as candidates for connection to wireless terminal 12.

In that case, for example, management server 11 uses location information of wireless terminal 12 to select candidates for connection from networks 13 with service area including the location of wireless terminal 12. Management server 11 usually selects a plurality of networks as candidates for connection.

Wireless terminal 12 is a wireless terminal that can be connected to networks 13A to 13C. Wireless terminal 12 requests a network connection to management server 11, notifies a condition that is requested by wireless terminal 12, and receives a notification of candidates for connection from management server 11. Wireless terminal 12 may notify, to management server 11, the location information indicating the location of wireless terminal 12 measured by a GPS as part of the requested condition.

Wireless terminal 12 then measures the changing service characteristics of the notified candidates for connection, selects one of networks 13 from among the candidates for connection based on the measurement result, and connects to selected network 13.

As described, in the present exemplary embodiment, the changing service characteristics include the transmission speed when the wireless terminal performs data communication. Wireless terminal 12 uses a test packet to measure effective transmission speeds of the networks determined as candidates for connection. Wireless terminal 12 compares the required transmission speed and the measured transmission speed for each type of data communication to be executed, selects one of networks 13 from among the candidates for connection, and executes data communication with selected network 13.

In that case, wireless terminal 12 can select network 13, in which the measured transmission speed is closest to the required transmission speed.

To concurrently perform a plurality of types of data communications, wireless terminal 12 may select and connect networks 13 according to the types of data communications and use the corresponding networks to perform the plurality of types of data communications.

While being connected to and communicating with selected network 13, wireless terminal 12 measures the transmission speeds of the candidates for connection including network 13 and changes the network to be connected from among the candidates for connection according to the measurement result.

In this case, wireless terminal 12 notifies the measured transmission speeds to management server 11. Management server 11 includes and holds the latest transmission speed notified from wireless terminal 12 in the network information and uses the latest transmission speed to select a candidate for connection. Management server 11 may also notify the transmission speed of the candidate for connection when notifying the candidate for connection to wireless terminal 12.

In this case, management server 11 further holds network information of a network of a wired line, selects network 13 satisfying the condition that is requested by wireless terminal 12 from a network of the wireless line and a network of the wired line, and notifies selected network 13 as a candidate for connection to wireless terminal 12.

Wireless terminal 12 can also be connected to a network of a wired line, and when a plurality of types of data communications are concurrently performed, wireless terminal 12 selects a network of the wired line if the transmission speed measured in the network of the wired line included in the candidate for connection is greater than the total of the transmission speeds required in the plurality of types of data communications and uses the network of the wired line to perform the plurality of types of data communications.

An operation by the wireless communication system of the second exemplary embodiment to determine the connection of the wireless terminal is the same sequence as in the first exemplary embodiment shown in FIG. 2. In the second exemplary embodiment, wireless terminal 12 measures the transmission speeds of networks 13A to 13C as the candidates for connection in step 105. In step 106, wireless terminal 12 selects network 13 that is optimal as a connection based on transmission speeds of networks 13A to 13C and connects to selected network 13.

An operation of changing the connection of the wireless terminal in the second exemplary embodiment is the same sequence as in the first exemplary embodiment shown in FIG. 3. In the second exemplary embodiment, wireless terminal 12 periodically measures the transmission speeds of networks 13A to 13C as candidates for connection to determine whether to switch the connection in step 202. In the measurement of the transmission speeds (step 203), if the transmission speed of network 13A as the current connection is reduced and does not satisfy the requested condition, wireless terminal 12 switches the connection from network 13A to another network 13 satisfying the requested condition (step 204).

Figure 6:
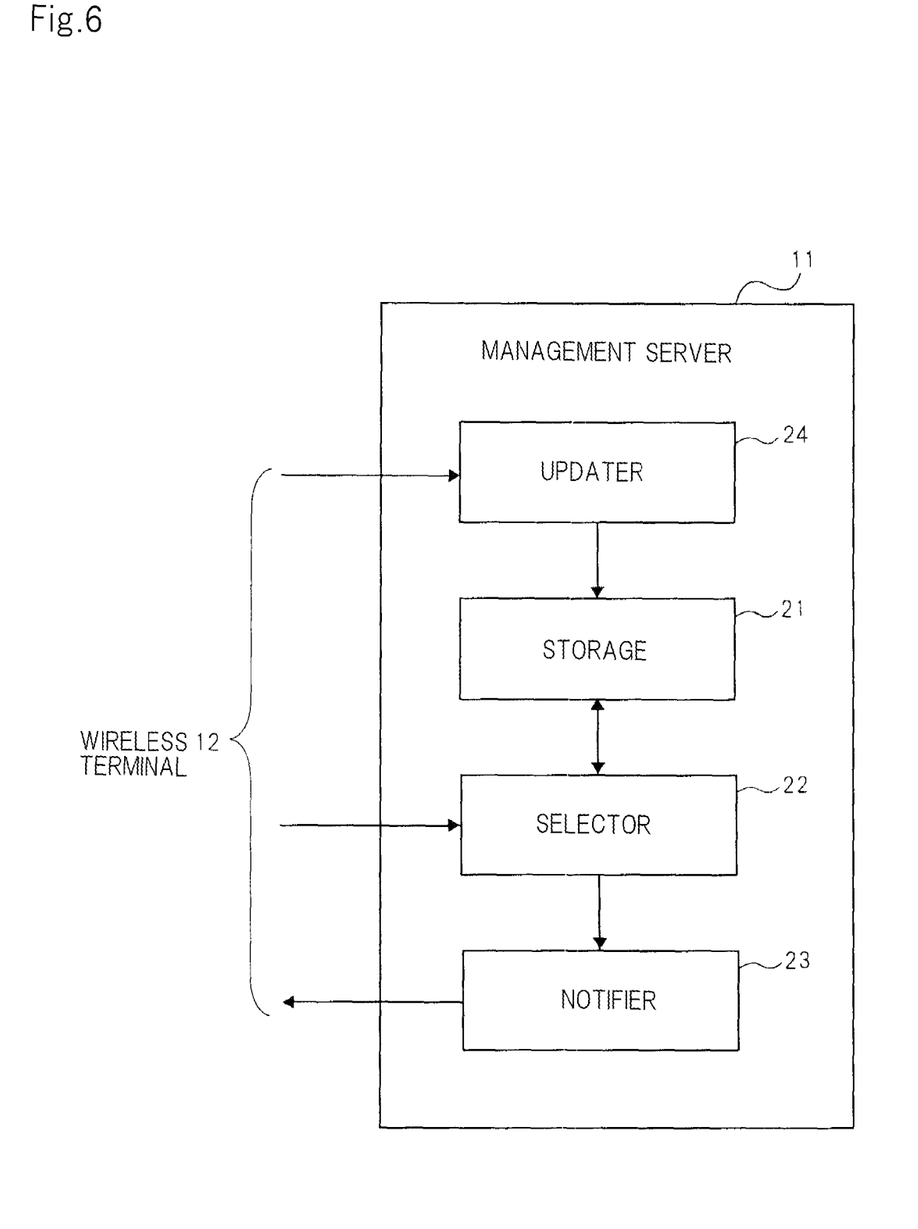
FIG. 6 is a block diagram of a configuration of management server 11 of second exemplary embodiment.

FIG. 6 is a block diagram of a configuration of management server 11 of the second exemplary embodiment. Referring to FIG. 6, management server 11 of the second exemplary embodiment further includes updater 24 in addition to the configuration of the first exemplary embodiment shown in FIG. 4.

Storage 21, selector 22, and notifier 23 in the second embodiment are the same as in the first embodiment. Storage 21 holds network information including the transmission speeds of the networks. Updater 24 receives the transmission speed of the network notified from wireless terminal 12 and updates the transmission speed of the network held by storage 21.

Figure 7:
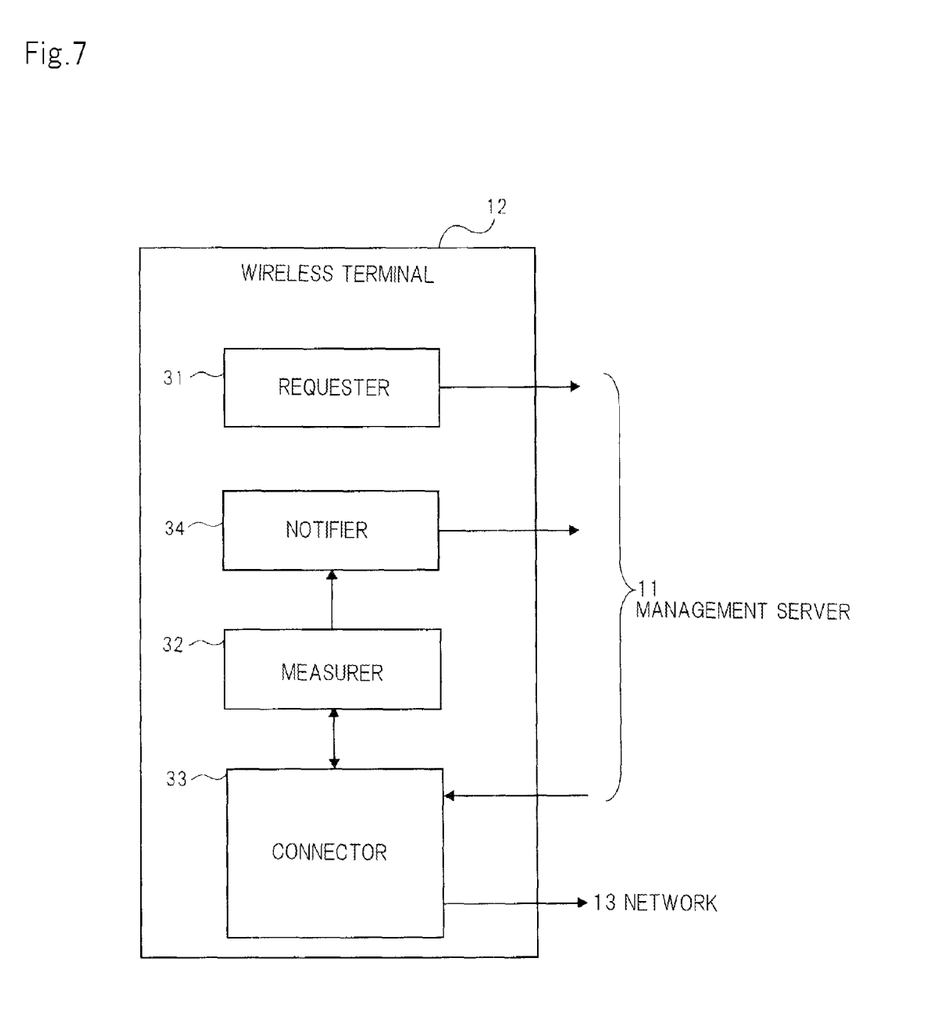
FIG. 7 is a block diagram of a configuration of wireless terminal 12 of the second exemplary embodiment.

FIG. 7 is a block diagram of a configuration of wireless terminal 12 of the second exemplary embodiment. Referring to FIG. 7, wireless terminal 12 of the second exemplary embodiment further includes notifier 34 in addition to the configuration of the first exemplary embodiment shown in FIG. 5.

Requester 31, measurer 32, and connector 33 in the second exemplary embodiment are the same as in the first exemplary embodiment. Measurer 32 measures the transmission speeds of the networks as candidates for connection notified from management server 11. Notifier 34 notifies the transmission speeds of the candidates for connection measured by measurer 32 to management server 11.

As described, according to the present exemplary embodiment, wireless terminal 12 makes a selection based on the transmission speed required to follow a change. Therefore, a network can be appropriately selected according to a change in the transmission speed.

Although the changing service characteristics include the transmission speed when the wireless terminal performs data communication in the present exemplary embodiment, only the transmission speed may be used as the changing service characteristics.

Management server 11 of the first and second exemplary embodiments can also realize by causing a computer to execute a software program defining the procedures of the components of management server 13.

Although the exemplary embodiment has been described, the present invention is not limited to the exemplary embodiment, and part of the configurations may be changed within the technical concept of the present invention.

What is claimed is:

1. A wireless communication system comprising:
 a management server that holds network information about unchanging service characteristics of each of a plurality of networks constituting a communication area by wireless; and
 a wireless terminal that can connect to the plurality of networks, wherein
 the management server selects networks satisfying a condition that is requested by a wireless terminal that has requested a connection based on the network information and notifies the selected networks as candidates for connection to the wireless terminal, and
 the wireless terminal requests a connection to the management server, measures changing service characteristics of the candidates for connection notified from the management server, selects a network from the candidates for connection based on a measurement result, and connects to the selected network, wherein
 the changing service characteristics include a transmission speed at the time the wireless terminal is connected to the candidate for connection, and
 the wireless terminal holds, in advance, transmission speeds required for a plurality of types of data communications, measures the transmission speeds of the candidates for connection notified from the management server, selects a network among the candidates for connection for each type of data communication to be performed based on the comparison between the required transmission speed and the measured transmission speed, and performs the data communication with the selected network.

2. The wireless communication system according to claim 1, wherein
the wireless terminal selects a network in which the measured transmission speed is closest to the required transmission speed.

3. The wireless communication system according to claim 1, wherein
the wireless terminal selects and connects to networks according to a plurality of types of data communications to concurrently perform the plurality of types of data communications and uses corresponding networks to perform the plurality of types of data communications.

4. The wireless communication system according to claim 1, wherein
the wireless terminal notifies the measured transmission speeds to the management server, and
the management server includes and holds the latest transmission speed notified from the wireless terminal in the network information and uses the latest transmission speed to select the candidate for connection.

5. The wireless communication system according to claim 1, wherein
the management server further holds network information of a network of a wired line, selects a network satisfying the condition that is requested by the wireless terminal from among a network of the wireless line and a network of the wired line, and notifies the selected network as a candidate for connection to the wireless terminal, and
the wireless terminal can also be connected to a network of a wired line, and when a plurality of types of data communications are concurrently performed, the wireless terminal selects a network of the wired line if the transmission speed measured in the network of the wired line included in the candidate for connection is greater than the total of the transmission speeds required in the plurality of types of data communications and uses the network of the wired line to perform the plurality of types of data communications.

6. A management server comprising:
a storage that holds network information about unchanging service characteristics of each of a plurality of networks constituting a communication area by wireless;
a selector that selects networks that satisfy a condition that is requested by a wireless terminal that has requested a connection based on the network information held by the storage; and
a notifier that notifies the networks selected by the selector, as candidates for connection, to the wireless terminal, wherein
the wireless terminal measures changing service characteristics of the candidates for connection notified from the management server, selects a network from the candidates for connection based on a measurement result, and connects to the selected network,
the changing service characteristics include a transmission speed at the time the wireless terminal is connected to the candidate for connection,
the wireless terminal holds, in advance, transmission speeds required for a plurality of types of data communications, measures the transmission speeds of the candidates for connection notified from the management server, selects a network among the candidates for connection for each type of data communication to be performed based on the comparison between the required transmission speed and the measured transmission speed, and performs the data communication with the selected network, and
wherein the storage includes and holds a latest transmission speed notified from the wireless terminal in the network information.

7. A wireless terminal that can connect to a plurality of networks constituting a communication area by wireless, the wireless terminal comprising:
a requester that transmits a connection request to a management server holding network information about unchanging service characteristics of the plurality of networks;
a measurer that measures changing service characteristics of candidates for connection selected by the management server based on the unchanging service characteristics of the network information in response to the connection request; and
a connector that selects a network from among the candidates for connection based on a measurement result by the measurer and that connects to the selected network, wherein
the changing service characteristics include a transmission speed at the time the wireless terminal is connected to the candidate for connection,
the measurer measures the transmission speeds of the candidates for connection notified from the management server, and
the connector holds, in advance, a transmission speed required for each type of a plurality of data communications, selects a network from among the candidates for connection for each type of data communication to be performed based on the comparison between the required transmission speed and the measured transmission speed, and performs the data communication with the selected network.

8. The wireless terminal according to claim 7, wherein
the connector selects a network in which the measured transmission speed is closest to the required transmission speed.

9. The wireless terminal according to claim 7, wherein
the connector selects and connects to networks according to a plurality of types of data communications to concurrently perform the plurality of types of data communications and uses corresponding networks to perform the plurality of types of data communications.

10. A network selection method of selecting a connection of a wireless terminal from among a plurality of networks constituting a communication area by wireless, the network selection method comprising:
holding, by a management server in advance, network information about unchanging service characteristics of the plurality of networks;
requesting, by the wireless terminal, a connection to the management server;
selecting, by the management server, networks satisfying a condition that is requested by the wireless terminal based on the network information and notifying the selected networks as candidates for connection to the wireless terminal; and
measuring, by the wireless terminal, changing service characteristics of the notified candidates for connection and selecting a connection from among the candidates for connection based on a measurement result, wherein the changing service characteristics include a transmission speed at the time the wireless terminal is connected to the candidate for connection, and in the wireless terminal, a transmission speed is held, in advance, required for each type of a plurality of data communications, the transmission speeds of the candidates for connection notified from the management server are measured, a network is selected among the candidates for connection for each type of data communication to be performed based on the comparison between the required transmission speed and the measured transmission speed, and the data communication is performed with the selected network.

11. The network selection method according to claim 10, wherein in the wireless terminal, a network is selected in which the measured transmission speed is closest to the required transmission speed.

12. The network selection method according to claim 10, wherein in the wireless terminal, networks are selected and connected according to a plurality of types of data communications to concurrently perform the plurality of types of data communications, and corresponding networks are used to perform the plurality of types of data communications.

* * * * *